(12) United States Patent
Cho

(10) Patent No.: US 12,313,552 B2
(45) Date of Patent: May 27, 2025

(54) RAMAN SPECTROSCOPIC DEVICE

(71) Applicant: ANSWERAY INC., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 55 days.

(21) Appl. No.: 18/277,705

(22) PCT Filed: Feb. 18, 2022

(86) PCT No.: PCT/KR2022/002464
§ 371 (c)(1),
(2) Date: Aug. 17, 2023

(87) PCT Pub. No.: WO2022/177373
PCT Pub. Date: Aug. 25, 2022

(65) Prior Publication Data
US 2024/0310284 A1    Sep. 19, 2024

(30) Foreign Application Priority Data

Feb. 19, 2021  (KR) .................. 10-2021-0022498
Feb. 18, 2022  (KR) .................. 10-2022-0021774

(51) Int. Cl.
*G01J 3/44*      (2006.01)
*G01J 3/02*      (2006.01)
*G01N 21/65*     (2006.01)

(52) U.S. Cl.
CPC ............ *G01N 21/65* (2013.01); *G01J 3/0208* (2013.01); *G01J 3/0218* (2013.01); *G01J 3/4412* (2013.01)

(58) Field of Classification Search
CPC ...... G01N 21/65; G01J 3/0208; G01J 3/0218; G01J 3/4412; G01J 3/02; G01J 3/44;
(Continued)

(56) References Cited

U.S. PATENT DOCUMENTS 4,200,802 A  *  4/1980  Salzman ............ G01N 15/1436
                                                356/318
11,307,091 B2 *  4/2022  Cho ...................... G01J 3/0289
(Continued)

FOREIGN PATENT DOCUMENTS

JP  2007179002 A  *  7/2007  ................ G01J 3/02
JP  2015-040752 A     3/2015
(Continued)

OTHER PUBLICATIONS

International Search Report for PCT/KR2022/002464 mailed Jun. 7, 2022 from Korean Intellectual Property Office.

*Primary Examiner* — Abdullahi Nur
(74) *Attorney, Agent, or Firm* — Paratus Law Group, PLLC

(57) ABSTRACT

A Raman spectroscopic device includes a light capturing unit between a light analysis unit and a target, the light analysis unit includes a light sensor, a light collection lens, a diffraction grating, a light generator, a dichroic mirror, and a light passing lens, and the light capturing includes one first light guide and at least one second light guide, which are arranged sequentially toward the target from the light analysis unit, receives light of the light generator from the light passing lens and transmits the light to the target or receives scattered light from the target and transmits the scattered light to the light passing lens by means of the first light guide and the second light guide.

22 Claims, 5 Drawing Sheets

(58) Field of Classification Search
CPC ....... G01J 3/14; G01J 3/18; G01J 3/28; G02B 21/00; G02B 3/14
See application file for complete search history.

(56) References Cited

U.S. PATENT DOCUMENTS

| | | | | |
|---|---|---|---|---|
| 2007/0132994 | A1* | 6/2007 | Kobayashi | G01J 3/44 |
| | | | | 356/328 |
| 2014/0002819 | A1* | 1/2014 | Kawata | G01N 21/65 |
| | | | | 356/326 |
| 2020/0408693 | A1 | 12/2020 | Zhou et al. | |

FOREIGN PATENT DOCUMENTS

| | | |
|---|---|---|
| JP | 2021-012137 A | 2/2021 |
| KR | 10-2013-0113136 A | 10/2013 |
| KR | 10-2019-0096294 A | 8/2019 |
| KR | 10-2020-0129732 A | 11/2020 |

* cited by examiner

RAMAN SPECTROSCOPIC DEVICE

CROSS-REFERENCE TO PRIOR APPLICATIONS

This Application is a National Stage Patent Application of PCT International Application No. PCT/KR2022/002464 (filed on Feb. 18, 2022), which claims priority to Korean Patent Application Nos. 10-2021-0022498 (filed on Feb. 19, 2021) and 10-2022-0021774 (filed on Feb. 18, 2022), which are all hereby incorporated by reference in their entirety.

BACKGROUND

The present disclosure relates to a Raman spectroscopic device that includes a light capturing unit around a light analysis unit and captures and analyzes scattered light using the light capturing unit and the light analysis unit while generating scattered light from a target by emitting light to the target through the light capturing unit from the light analysis unit.

In general, Raman spectroscopic equipment proposes Raman spectroscopy that does not need milling or polishing in a material preparation process and is little influenced by water and the state of a substrate in a material analysis process. Raman spectroscopy is based on the principle of generating scattered light from an analysis target material by emitting incident light (e.g., a laser) to the analysis target material and of measuring relative energy (or wavelength or frequency) variation of inelastic scattered light to the incident light, so the result of analyzing an analysis target material is little influenced by the wavelength of incident light.

Further, Raman spectroscopy has many advantages such as that analysis time for analysis target materials is short, it makes possible to analyze analysis target materials in a liquid state or a solid state, or a gas state, and there is no possibility of damaging analysis target materials (hereafter, referred to as a target) because it is nondestructive analysis. Meanwhile, referring to FIG. 1, the Raman spectroscopic equipment 30 includes a light analysis unit 10 and a light capturing unit 30. The light analysis unit 10 includes a light sensor 1, a light collection lens 3, a diffraction grating 4, a light generator 6, a dichroic mirror 7, and a light passing lens 9. The light capturing unit 30 includes first and second convex lenses 14 and 18.

In the light analysis unit 10, light 5 from the light generator 6 is reflected by the dichroic mirror 7 and then transmitted to a slit S of the light analysis 10 through the light passing lens 9. The light passing lens 9 is a convex lens. In the light capturing unit 30, the first and second convex lenses 14 and 18 receive and pass the light 5 from the slit S of the light analysis unit 10, whereby the light 5 reaches to the target 40. The target 40 generates scattered light 44 by coming in contact with the light 5. The scattered light 44, in FIG. 2, is composed of elastic scattered light 44 and inelastic scattered light 42 and 43.

The elastic scattered light 44, in FIG. 3, has the same energy as the light 5 from the light generator 6. The inelastic scattered light 42 and 43 has lower energy (see reference numbers '42' in FIG. 3) than the light 5 from the light generator 6 or higher energy (see reference number '43' in FIG. 3) than the light 5 from the light generator 6. That is, the photons of the scattered light 44 produce elastic scattered light 41 and inelastic scattered light 42 and 43 while molecular energy increases from a vibrational energy state 54 to a virtual energy state 58 by absorbing molecular energy at the target 40 from the light 5 emitted from the light generator 6 and drops from the virtual energy state 58 to different vibrational energy states 54.

In the light capturing unit 30, the first and second convex lenses 14 and 18 capture scattered light 44 from the target 40 using the second convex lens 18 and collect scattered light 44 to the slit S of the light analysis unit 10 using the first convex lens 14 while passing the scattered light 44 therethrough. In the light analysis unit 10, the light passing lens 9 and the dichroic mirror 7 receives the scattered light 44 from the slit S of the light analysis unit 10 using the light passing lens 9 and pass inelastic scattered light 42 or 43 of the scattered light 44 using the dichroic mirror 7.

Further, in the light analysis unit 10, the diffraction grating 4 receives inelastic scattered light 42 or 43 from the dichroic mirror 7 and decomposes the inelastic scattered light 42 or 43 in accordance with wavelengths. The light collection lens 3 receives the scattered light 48 decomposed by the diffraction grating 4 and collects and transmits the decomposed scattered light 48 to the light sensor 1. Thereafter, the Raman spectroscopic equipment 30, though not shown in the figures, shows the luminous intensity of the inelastic scattered light 42 or 43 according to Raman shift (/cm) on a monitor through the light sensor 1. In the Raman spectroscopic equipment 30, the light capturing unit 20 makes a translational motion M relative to the light analysis unit 10.

That is, the light capturing unit 20 moves the second block lens 18 close to the target 40 or moves the second block lens 18 away from the target 40 by applying a zoom function. However, the translation motion M of the light capturing unit 20 is limited by the performance of the zoom function, whereby the distance between the light analysis unit 10 and the target 40 is made uniform, which makes it difficult to sufficiently capture the scattered light 44 from the target through the second convex lens 18. Further, the zoom function of the light capturing unit 20 requires specific tools around the first and second convex lenses 14 and 18, which makes the structure of the light capturing unit complicated and increases the manufacturing cost of the Raman spectroscopic equipment 30.

Meanwhile, the Raman spectroscopic equipment has been similarly disclosed in Korean Patent Application Publication No. 10-2013-0113136, titled "Noninvasive linearly-illuminated spatially offset Raman spectroscopy".

SUMMARY

The present disclosure has been made in an effort to solve the problems of the related art and an objective of the present disclosure is to provide a Raman spectroscopic device that includes a light capturing unit around a light analysis unit, increases optical performance by applying a simple structure to the light capturing unit, and is suitable for sufficiently capturing scattered light from a target at the light capturing unit while generating scattered light from the target by emitting light to the target through the light capturing unit from the light analysis unit.

A Raman spectroscopic device includes a light capturing unit and a light analysis unit disposed away from a target, includes a light sensor, a light collection lens, a diffraction grating, and a light passing lens at the light analysis unit, produces scattered light at the target by generating and then emitting light to the target by means of one of the light analysis unit and the light capturing unit, captures the scattered light from the target and transmits the scattered light to the light analysis unit by means of the light capturing unit, decomposes the scattered light in accordance with wavelengths at the diffraction grating while sequentially passing the scattered light through the light passing lens and the diffraction grating by means of the light analysis unit, and collects and transmits the decomposed scattered light to the light sensor by means of the light collection lens, in which the light capturing unit includes one first light guide and at least one second light guide that are sequentially arranged toward the target from the light analysis unit, and transmits the light to the target through at least one of the first light guide and the second light guide or receives the scattered light from the target through the first light guide and the second light guide and transmits the scattered light to the light passing lens.

The first light guide may include a first light extension lens and a second light extension lens that are convex lenses and sequentially positioned away from the light passing lens, and may make the scattered light parallel between the first light extension lens and the second light extension lens; the first light extension lens may have a focal point at an aperture of the light analysis unit and may have the same numerical aperture (NA) as the light passing lens; and the second light extension lens may have a numerical aperture that is the same as or different from that of the light passing lens.

When the light passing lens is a convex lens, the first and second light extension lenses may share a focal point with the light passing lens at the aperture of the light analysis unit at the first light extension lens, and may have a focal point in front of the second light guide positioned closest to the second light extension lens at the second light extension lens.

When the first light guide includes first and second light extension lenses, which are convex lenses and sequentially positioned from the light passing lens, and there is one second light guide, the second light guide may include third and fourth light extension lenses that are convex lenses and positioned sequentially from the second light extension lens, may have a larger numerical aperture than the first and second light extension lenses at the third and fourth light extension lenses, may have a numerical aperture, which is the same as or different from that of the fourth light extension lens, at the third light extension lens, and may make the scattered light parallel between the third and fourth light extension lenses.

When the light passing lens is a convex lens, the third and fourth light extension lenses may share a focal point with the second light extension lens at the third light extension lens, and may have a focal point on the target at the fourth light extension lens.

When the first light guide includes first and second light extension lenses, which are convex lenses and sequentially positioned from the light passing lens, and there is a plurality of second light guides, the plurality of second light guides, in each second light guide, may include third and fourth light extension lenses that are convex lenses and positioned sequentially toward the target from the first light guide, may make the scattered light parallel between the third and fourth light extension lenses, and may have a numerical aperture that gradually increases toward the target from the first light guide.

When the light passing lens is a convex lens, a first second light guide positioned close to the first light guide, a last second light guide positioned close to the target, and intermediate second light guides positioned between the first second light guide and the last second light guide may share a focal point with the second light extension lens of the first light guide at the third light extension lens of the first second light guide, may have a focal point on the target at the fourth light extension lens of the last second light guide, and may share a focal point between the fourth light extension lens of a front second light guide of two adjacent second light guides and the third light extension lens of a rear second light guide of the two adjacent second light guides through the first second light guide, the intermediate second light guides, and the last second light guide.

The first light guide may include a first light extension lens being a convex lens and a second light extension lens being a concave lens that are sequentially positioned away from the light passing lens, and may make the scattered light parallel between the first light extension lens and the second light extension lens; the first light extension lens may have a focal point at an aperture of the light analysis unit and may have the same numerical aperture as the light passing lens; and the second light extension lens may have a numerical aperture that is the same as or different from that of the light passing lens.

When the light passing lens is a convex lens, the first and second light extension lenses may share a focal point with the light passing lens at the aperture of the light analysis unit at the first light extension lens, and may receive collected and inclined parallel light of the second light guide positioned closest to the second light extension lens at the second light extension lens.

When the first light guide includes a first light extension lens being a convex lens and a second light extension lens being a concave lens, which are sequentially positioned from the light passing lens, and there is one second light guide, the second light guide may include third and fourth light extension lenses that are convex lenses and positioned sequentially from the second light extension lens, may have a larger numerical aperture than the first and second light extension lenses at the third and fourth light extension lenses, may have a numerical aperture, which is the same as or different from that of the fourth light extension lens, at the third light extension lens, and may make the scattered light parallel between the third and fourth light extension lenses.

When the light passing lens is a convex lens, the third and fourth light extension lenses may transmit the scattered light at an angle to the second light extension lens at the third light extension lens, and may have a focal point on the target at the fourth light extension lens.

When the first light guide includes a first light extension lens being a convex lens and a second light extension lens being a concave lens, which are sequentially positioned from the light passing lens, and there is a plurality of second light guide, the plurality of second light guides, in each second light guide, may include third and fourth light extension lenses that are convex lenses and positioned sequentially toward the target from the first light guide, may make the scattered light parallel between the third and fourth light extension lenses, and may have a numerical aperture that gradually increases toward the target from the first light guide.

When the light passing lens is a convex lens, a first second light guide positioned close to the first light guide, a last second light guide positioned close to the target, and intermediate second light guides positioned between the first second light guide and the last second light guide may transmit the scattered light at an angle to the first light guide at the third light extension lens of the first second light guide, may have a focal point on the target at the fourth light extension lens of the last second light guide, and may share a focal point between the fourth light extension lens of a front second light guide of two adjacent second light guides and the third light extension lens of a rear second light guide of the two adjacent second light guides through the first second light guide, the intermediate second light guides, and the last second light guide.

When the first light guide includes first and second light extension lenses that are convex lenses, or a convex lens and a concave lens, the second light guide includes third and fourth light extension lenses that are convex lenses, and the first to fourth light extension lenses are horizontally positioned with respect to a traveling direction of the light, a length L of the light capturing unit may be, for example, described but not restricted to, $L=2\Sigma_{k=1}^{2n} f_k$ (where k and n are natural numbers, $f_k$ is the focal distance of the k-th lens, and n≥2) between the light analysis unit 10 and the target, and the first to fourth light extension lenses may have a numerical number $(NA_k)$=(lens diameter $(D_k)$/(2×focal distance $(f_k)$), (where k is a natural number from 1 to 2n) at each light extension lens.

A focal distance $f_{2n}$ of a k=2n-th lens may be $f_{2n}=f_1*m$ (where m is a scaling factor), a lens diameter $D_{2n}$ of the k=2n-th lens may be $D_{2n}=D_1*m$, and a numerical aperture $NA_{2N}$ of the k=2n-th lens may be $NA_{2N}=NA_1$.

A focal distance $f_{2n}$ of a k=2n-th lens may be $f_{2n}=f_1*m1$ (where m1 is a first scaling factor), a lens diameter $D_{2n}$ of the k=2n-th lens may be $D_{2n}=D_1*m2$ (where m2 is a second scaling factor), the first scaling factor m1 may have a different size from the second scaling factor m2, and a numerical aperture $NA_{2N}$ of the k=2n-th lens may be $NA_{2N}\neq NA_1$.

The first light guide may include a first light extension lens and a second light extension lens that are positioned sequentially from the light analysis unit, the second light guide may include a first lens-mirror combination and a second lens-mirror combination that are positioned sequentially from the first light guide, and the first and second lens-mirror combinations may be formed, in each lens-mirror combination, by arranging at least one of a flat lens, a convex lens, a concave lens, and a aspheric lens and at least one of a flat mirror, a concave mirror, and a convex mirror.

The first and second light extension lenses and the first and second lens-mirror combinations may be spaced apart from a path of the light or may be positioned in the path of the light.

The first light guide may include a first lens-mirror combination and a second lens-mirror combination that are positioned sequentially from the light analysis unit, the second light guide may include a third lens-mirror combination and a fourth lens-mirror combination that are positioned sequentially from the first light guide, and the first and fourth lens-mirror combinations may be formed, in each lens-mirror combination, by arranging at least one of a flat lens, a convex lens, a concave lens, and a aspheric lens and at least one of a flat mirror, a concave mirror, and a convex mirror.

The first to fourth lens-mirror combinations may be spaced apart from a path of the light or may be positioned in the path of the light.

When the light analysis unit includes a dichroic mirror between the diffraction grating and the light passing lens and includes a light generator configured to emit the light to the dichroic mirror and the light capturing unit includes first and second light extension lenses, which are convex lenses, or a convex lens and a concave lens, at the first light guide and includes third and fourth light extension lenses that are convex lenses at the second light guide, the light may start from the dichroic mirror and reach the targets sequentially through the light passing lens and the first to fourth light extension lenses.

When the light capturing unit includes first and second light extension lenses, which are convex lenses, or a convex lens and a concave lens, at the first light guide, includes a dichroic mirror between the first and second light extension lenses at the first light guide, includes third and fourth light extension lenses that are convex lenses at the second light guide, and includes a light generator configured to emit light to the dichroic mirror around the first light guide and the second light guide, the light may start from the dichroic mirror and reach the targets the second light extension lens, the third light extension lens, and the fourth light extension lens.

A Raman spectroscopic device according to the present disclosure, includes a light analysis unit and a light capturing unit, includes a light sensor, a light collection lens, a diffraction grating, a light generator, a dichroic mirror, and a light passing lens in the light analysis unit, and includes first to fourth light guides positioned sequentially from the light passing lens in the light capturing unit, in which the light capturing unit is fixed to the light analysis unit, the focal points of the light passing lens and the first light guide are on an aperture of the light analysis unit, the focal point of the fourth light guide is on a target positioned around the light capturing unit at the opposite side to the light analysis unit, the numerical apertures of the light passing lens and the first light guide are made the same, and the numerical apertures of the first light guide and the fourth light guide are made the same or different, whereby while light of the light generator is emitted sequentially through the dichroic mirror, the light passing lens, the first to fourth light guides, and the target and scattered light is produced at the target, the light capturing unit can sufficiently capture scattered light from the target using the first to fourth light guides and the light analysis unit can easily analyze scattered light using the light sensor, the light collection lens, the diffraction grating, the light generator, the dichroic mirror, and the light passing lens.

DETAILED DESCRIPTION

Figure 1:
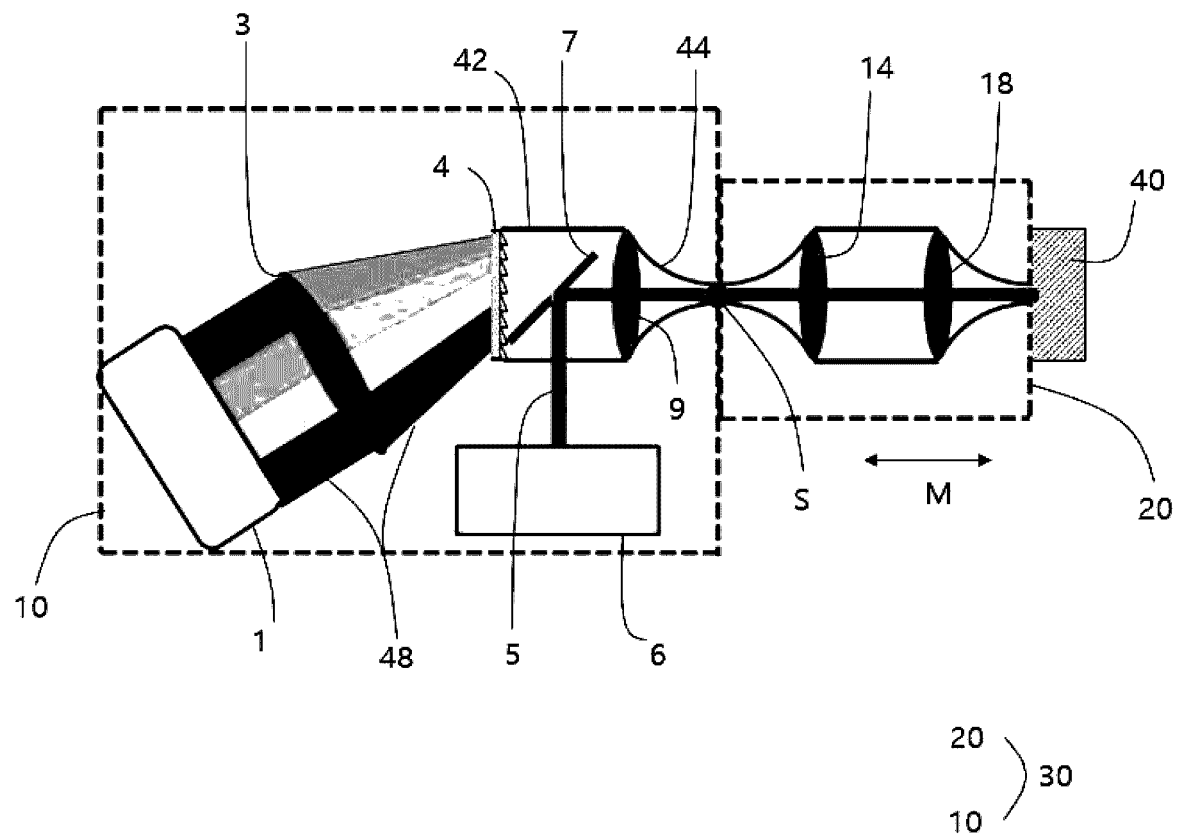
FIG. 1 is a schematic view showing the positional relationship of Raman spectroscopic equipment according to the related art and a target.
Figure 2:
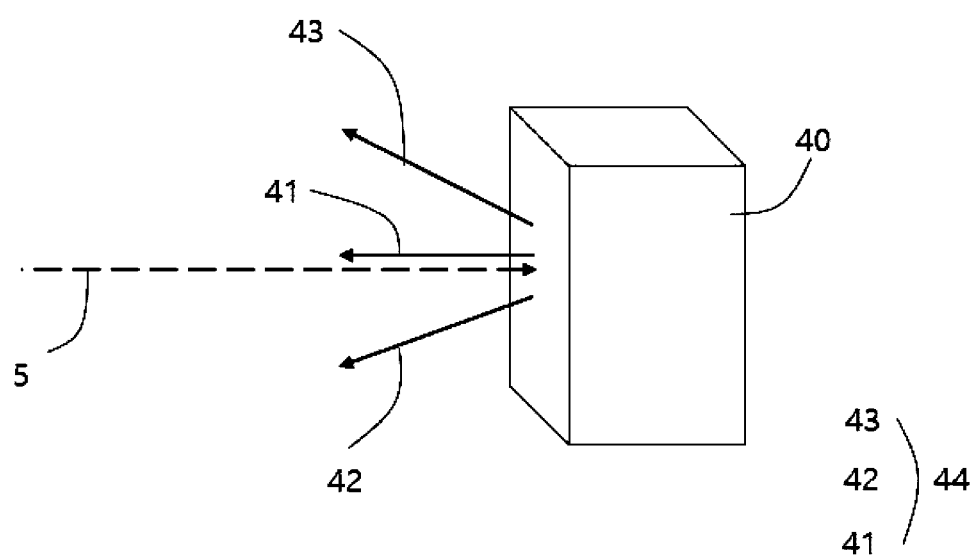
FIG. 2 is a schematic view showing scattered light that is generated from a target while light is emitted to the target from a light generator of the Raman spectroscopic equipment of FIG. 1.
Figure 3:
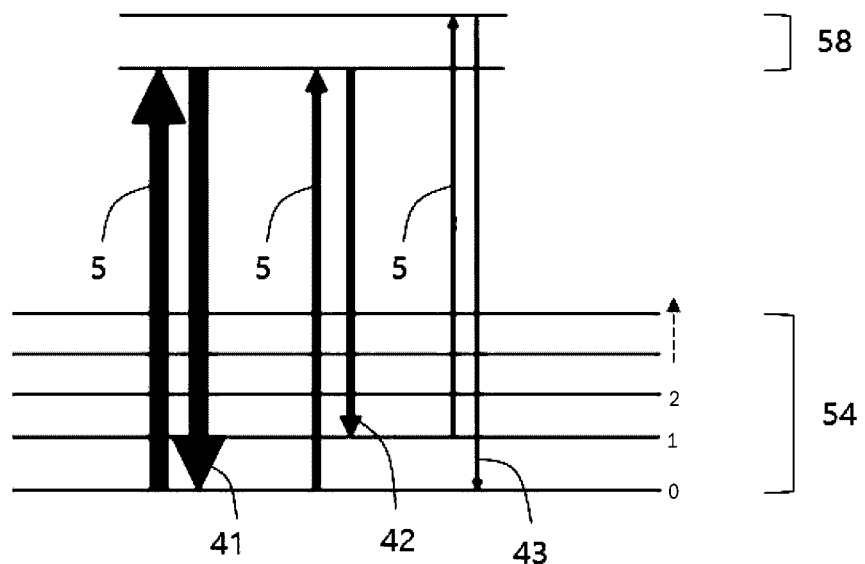
FIG. 3 is a schematic view showing molecular energy transition while scattered light is generated from the target of FIG. 2.

The following detailed description of the present disclosure provides specific embodiments for achieving the present disclosure and refers to the accompanying drawings. The embodiments are described in detail so that those skilled in the art can achieve the present disclosure. It should be understood that various embodiments of the present disclosure are different, but are not exclusive to each other. For example, specific shapes, structures, and characteristics described herein in relation to an embodiment may be achieved through other embodiments without departing from the spirit and scope of the present disclosure. Further, it should be understood that the positions or arrangement of components in embodiments may be changed without departing from the spirit and scope of the present disclosure. Accordingly, the following detailed description is not limitative and the scope of the present disclosure is, if appropriately described, limited only by the claims and equivalents of the claims. In the drawings, similar reference numerals indicate same or similar functions in various respects, and the length, area, thickness, and shape may be exaggerated for convenience.

Exemplary embodiments of the present disclosure are described in detail with reference to the accompanying drawings so that those skilled in the art can easily achieve the present disclosure.

Figure 4:
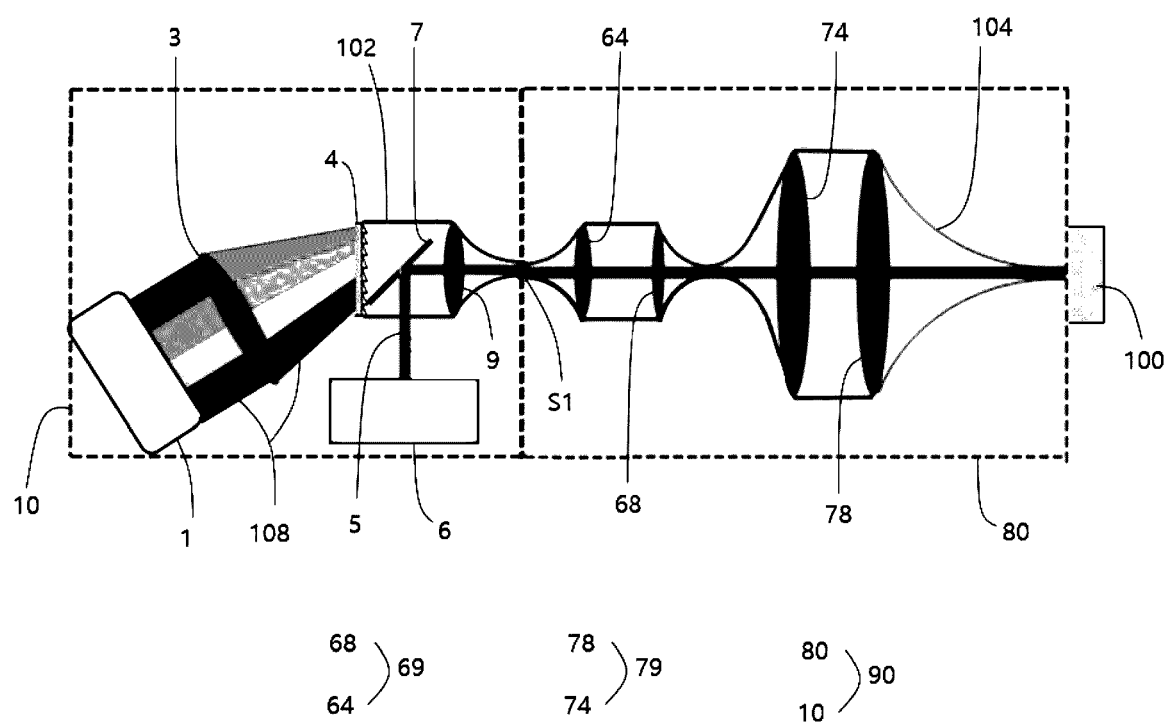
FIG. 4 is a schematic view showing a Raman spectroscopic device according to a first embodiment of the present disclosure.
Figure 7:
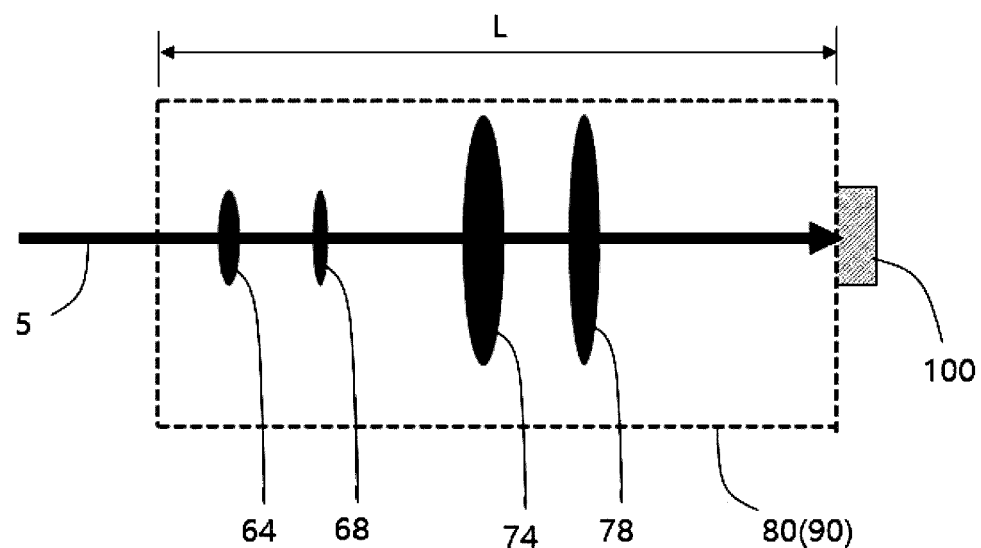
FIG. 7 is a schematic view showing the positional relationship of a light capturing unit and a target in the Raman spectroscopic device of FIG. 4.
Figure 8:
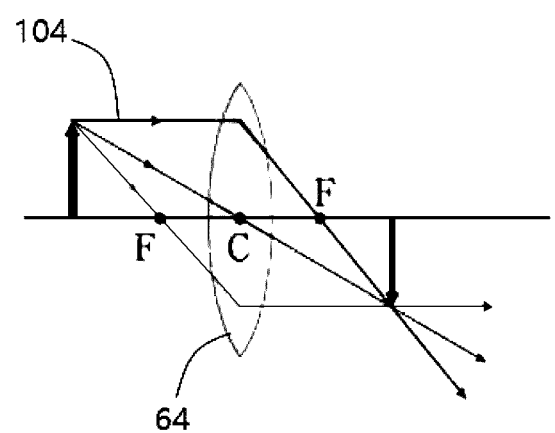
FIG. 8 is a schematic view showing the focal point of a convex lens in the light capturing unit of FIG. 4.

FIG. 4 is a schematic view showing a Raman spectroscopic device according to a first embodiment of the present disclosure, FIG. 7 is a schematic view showing the positional relationship of a light capturing unit and a target in the Raman spectroscopic device of FIG. 4, and FIG. 8 is a schematic view showing the focal point of a convex lens in the light capturing unit of FIG. 4.

Referring to FIGS. 4, 7, and 8, a Raman spectroscopic device 90 roughly includes a light capture unit 80 and a light analysis unit 10 sequentially away from a target 100, in which the light analysis unit 10 includes a light sensor 1, a light collection lens 3, a diffraction grating 4, and a light passing lens 9, and is configured to generate scattered light 104 to the target 10 while generating light 5 in one of the light analysis unit 10 and the light capturing unit 80 and emitting the light 5 to the target 100.

Further, the Raman spectroscopic device 90 is configured such that the scattered light 104 from the target 100 is captured in the light capturing unit 80 and transmitted to the light analysis unit 10, scattered light 102 is decomposed in accordance with wavelengths by the diffraction grating 4 while the scattered light 104 sequentially passes through the light passing lens 9 and the diffraction grating 4 in the light analysis unit 10, and the scattered light 102 is collected through the light collection lens 3 and transmitted to the light sensor 1. In this configuration, the dichroic mirror 7 passes the scattered light 102 having inelastic energy of the scattered light 104 having elastic and inelastic energy.

In more detail, the light capturing unit 80 includes one first light guide 69 and at least one second light guide 79 that are sequentially arranged toward the target 100 from the light analysis unit 10, transmits light 5 to the target 100 through at least one of the first light guide 69 and the second light guide 79 or receives the scattered light 104 from the target 100 through the first light guide 69 and the second light guide 79 and transmits the scattered light 104 to the light passing lens 9.

The first light guide 69 includes a first light extension lens 64 and a second light extension lens 68, which are convex lenses and sequentially positioned away from the light passing lens 9, and makes the scattered light 104 parallel between the first light extension lens 64 and the second light extension lens 68. In this configuration, the first light extension lens 64 has a focal point at an aperture S1 of the light analysis unit 10 and the same numerical aperture (NA) as the light passing lens 9. The second light extension lens 68 has a numerical aperture that is the same as or different from that of the light passing lens 9.

When the light passing lens 9 is a convex lens, the first and second light extension lenses 64 and 68 share a focal point with the light passing lens 9 at the aperture S1 of the light analysis unit 10 at the first light extension lens 64 and have a focal point in front of the second light guide 79 positioned closest to the second light extension lens 68 at the second light extension lens 68.

When the first light guide 69 includes first and second light extension lenses 64 and 68, which are convex lenses and sequentially positioned from the light passing lens 9, and there is one second light guide 79, the second light guide 79 includes third and fourth light extension lenses 74 and 78, which are convex lenses and positioned sequentially from the second light extension lens 68, has a larger numerical aperture than the first and second light extension lenses 64 and 68 at the third and fourth light extension lenses 74 and 78, has a numerical aperture, which is the same as or different from that of the fourth light extension lens 78, at the third light extension lens 74, and makes the scattered light 104 parallel between the third and fourth light extension lenses 74 and 78.

When the light passing lens 9 is a convex lens, the third and fourth light extension lenses 74 and 78 share a focal point with the second light extension lens 68 at the third light extension lens 74 and have a focal point on the target 100 at the fourth light extension lens 78.

When the first light guide 69 includes first and second light extension lenses 64 and 68, which are convex lenses and positioned sequentially from the light passing lens 9, and there is a plurality of second light guides 79, the plurality of second light guides 79 includes, in each second light guide 79, third and fourth light extension lenses 74 and 78, which are convex lenses and positioned sequentially toward the target 100 from the first light guide 69, makes the scattered light 104 parallel between the third and fourth light extension lenses 74 and 78, and has a numerical aperture that gradually increases toward the target 100 from the first light guide 69.

When the light passing lens 9 is a convex lens, the first second light guide 79 positioned close to the first light guide 69, the last second light guide 79 positioned close to the target 100, and the intermediate second light guides 79 positioned between the first second light guide 79 and the last second light guide 79 share a focal point with the second light extension lens 68 of the first light guide 69 at the third light extension lens 74 of the first second light guide 79, have a focal point on the target 100 at the fourth light extension lens 78 of the last second light guide 79, and share a focal point between the fourth light extension lens 78 of a front second light guide 79 of two adjacent second light guides 79 and the third light extension lens 74 of a rear second light guide 79 of the two adjacent second light guides 79 through the first second light guide 79, the intermediate second light guides 79, and the last second light guide 79.

When the first light guide 79 includes first and second light extension lenses 64 and 68 that are convex lenses, the second light guide 79 includes third and fourth light extension lenses 74 and 78 that are convex lenses, and the first to fourth light extension lenses 64, 68, 74, and 78 are horizontally positioned with respect to the traveling direction of light 5, the length L of the light capturing unit 80 may be, for example, described but not restricted to, $L=2\Sigma_{k=1}^{2n}f_k$ (where k and n are natural numbers, $f_k$ is the focal distance of the k-th lens, and n≥2) between the light analysis unit 10 and the target 100. The first to fourth light extension lenses 64, 68, 74, and 78 have a numerical number $(NA_k)$=(lens diameter $(D_k)$/(2×focal distance $(f_k)$), (where k is a natural number from 1 to 2n) at each light extension lens 64 or 68 or 74 or 78.

The focal distance $f_{2n}$ of the k=2n-th lens is $f_{2n}=f_1*m$ (where m is a scaling factor). The lens diameter $D_{2n}$ of the k=2n-th lens is $D_{2n}=D_1*m$. The numerical aperture $NA_{2N}$ of the k=2n-th lens is $NA_{2N}=NA_1$. Alternatively, the focal distance $f_{2n}$ of the k=2n-th lens may be $f_{2n}=f_1*m1$ (where m1 is a first scaling factor). The lens diameter $D_{2n}$ of the k=2n-th lens may be $D_{2n}=D_1*m2$ (where m2 is a second scaling factor). The first scaling factor m1 may have a different size from the second scaling factor m2. The numerical aperture $NA_{2N}$ of the k=2n-th lens may be $NA_{2N}\neq NA_1$.

Meanwhile, the Raman spectroscopic device 90 may include a long pass filter (not shown in the figures) between the diffraction grating 4 and the dichroic mirror 7.

Figure 5:
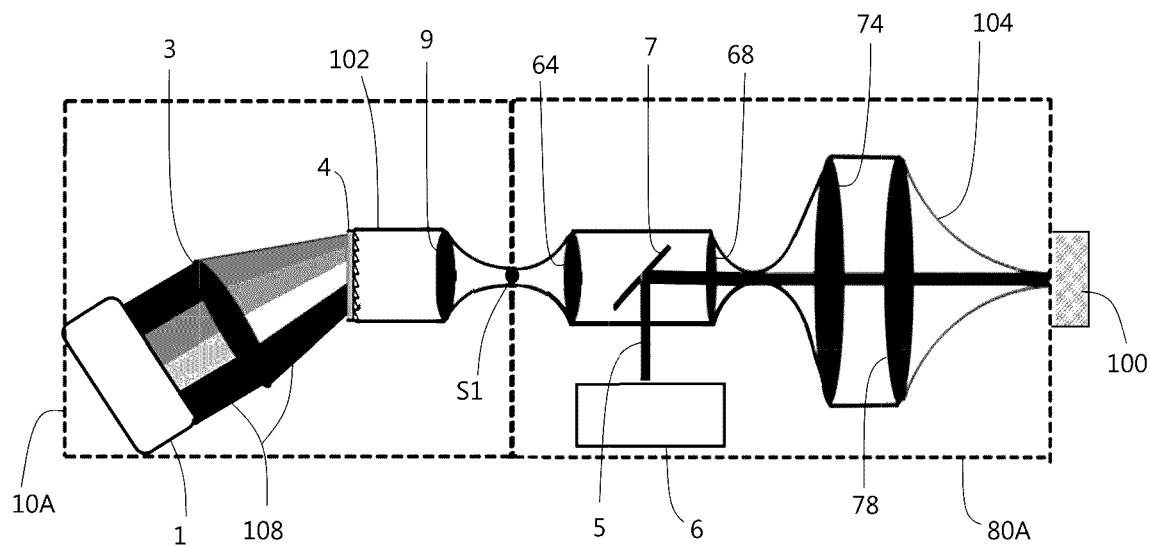
FIG. 5 is a schematic view showing a Raman spectroscopic device according to a second embodiment of the present disclosure.

FIG. 5 is a schematic view showing a Raman spectroscopic device according to a second embodiment of the present disclosure.

Referring to FIG. 5, the Raman spectroscopic device 90A has a structure similar to the Raman spectroscopic device 90 of FIG. 4. Accordingly, the Raman spectroscopic device 90A is not described, if possible, for the same configuration as the Raman spectroscopic device 90 of FIG. 4. In the Raman spectroscopic device 90A, a light analysis unit 10A includes a light sensor 1, a light collection lens 3, a diffraction grating 4, and a light passing lens 9. The light capturing unit 80A includes a light generator 6 around a first light guide 69 and a second light guide 79, includes a first light extension lens 64 and a second light extension lens 68 at the first light guide 69, includes a dichroic mirror 7 between the first light extension lens 64 and the second light extension lens 68, and includes a third light extension lens 74 and a fourth light extension lens 78 at the second light guide 79.

In the light capturing unit 80A, the light generator 6 emits light 5 to the dichroic mirror 7 and the light 5 reaches a target 100 sequentially through the second light extension lens 68, the third light extension lens 74, and the fourth light extension lens 78, whereby scattered light 104 is produced at the target 100. While the scattered light 104 sequentially passes through the fourth light extension lens 78, the third light extension lens 74, the second light extension lens 68, and the dichroic mirror 7, inelastic scattered light 102 is produced at the dichroic mirror 7. The inelastic scattered light 102 reaches the light sensor 1 sequentially through the first light extension lens 64, the aperture S1 of the light analysis unit 10A, the light passing lens 9, the diffraction grating 4, and the light collection lens 3.

Meanwhile, the Raman spectroscopic device 90A may include a long pass filter (not shown in the figures) between the first light extension lens 64 and the dichroic mirror 7.

Figure 6:
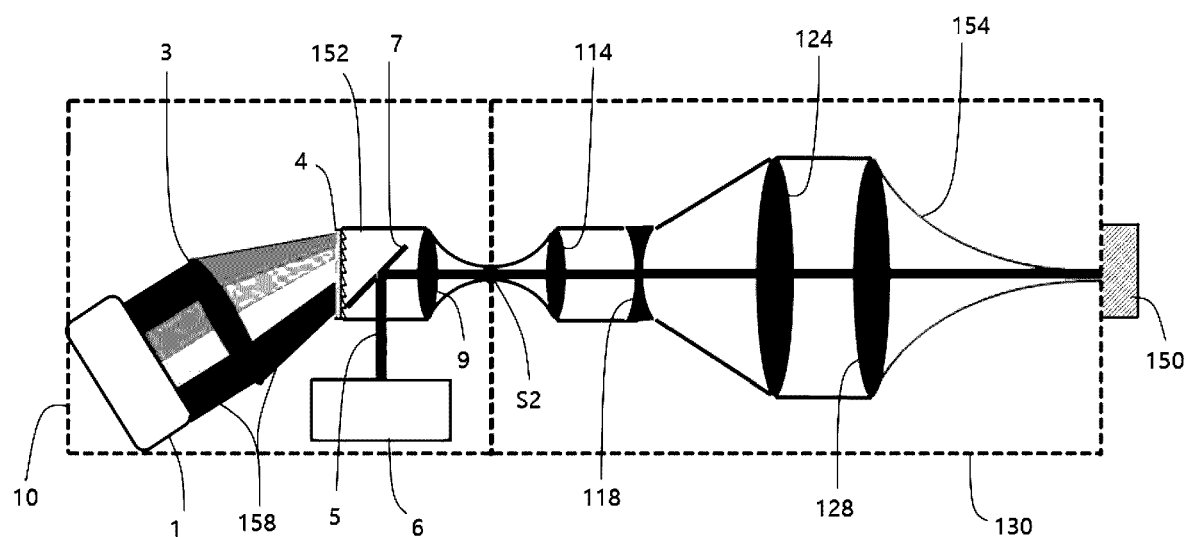
FIG. 6 is a schematic view showing a Raman spectroscopic device according to a third embodiment of the present disclosure.

FIG. 6 is a schematic view showing a Raman spectroscopic device according to a third embodiment of the present disclosure.

Figure 9:
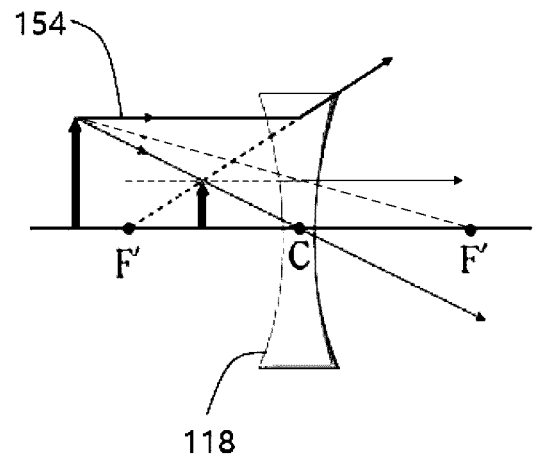
FIG. 9 is a schematic view showing the focal point of a concave lens in the light capturing unit of FIG. 5.

FIG. 9 is a schematic view showing the focal point of a concave lens in the light capturing unit of FIG. 5.

Referring to FIGS. 6 and 9, the Raman spectroscopic device 140 has a structure similar to the Raman spectroscopic device 90 of FIG. 4. Accordingly, the Raman spectroscopic device 140 is not described, if possible, for the same configuration as the Raman spectroscopic device 90 of FIG. 4. First, in the Raman spectroscopic device 140, the first light guide 119 includes a first light extension lens 114 being a convex lens and a second light extension lens 118 being a concave lens, which are sequentially positioned away from the light passing lens 9, and makes scattered light 104 parallel between the first light extension lens 114 and the second light extension lens 118.

The first light extension lens 114 has a focal point at an aperture of the light analysis unit 10 and has the same numerical aperture as the light passing lens 9. The second light extension lens 118 has a numerical aperture that is the same as or different from that of the light passing lens 9. When the light passing lens 9 is a convex lens, the first and second light extension lenses 114 and 118 share a focal point with the light passing lens 9 at the aperture S2 of the light analysis unit 10 at the first light extension lens 114 and receive collected and inclined parallel light of the second light guide 129 positioned closest to the second light extension lens 118 at the second light extension lens 118.

When the first light guide 119 includes a first light extension lens 114 being a convex lens and a second light extension lens 118 being a concave lens, which are sequentially positioned from the light passing lens 9, and there is one second light guide 129, the second light guide 129 includes third and fourth light extension lenses 124 and 128 that are convex lenses and sequentially positioned from the second light extension lens 118, has a numerical aperture larger than that of the first light extension lens 114 and the second light extension lens 118 at the third and fourth light extension lenses 124 and 128, has a numerical aperture, which is the same as or different from that of the fourth light extension lens 128, at the third light extension lens 124, and makes scattered light 154 parallel between the third and fourth light extension lenses 124 and 128.

When the light passing lens 9 is a convex lens, the third and fourth light extension lenses 124 and 128 transmit the scattered light 154 at an angle to the second light extension lens 118 at the third light extension lens 124 and have a focal point on the target 150 at the fourth light extension lens 128.

When the first light guide 119 includes a first light extension lens 114 being a convex lens and a second light extension lens 118 being a concave lens, which are sequentially positioned from the light passing lens 9, and there is a plurality of second light guide 129, the plurality of second light guide 129 includes, in each second light guide 129, third and fourth light extension lenses 124 and 128 sequentially positioned toward a target 150 from the first light guide 119, makes scattered light 154 parallel between the third and fourth light extension lenses 124 and 128, and has a numerical aperture that gradually increases toward the target 150 from the first light guide 119.

When the light passing lens 9 is a convex lens, the first second light guide 129 positioned close to the first light guide 119, the last second light guide 129 positioned close to the target 150, and the intermediate second light guides 79 positioned between the first second light guide 129 and the last second light guide 129 transmit scattered light 154 at an angle to the first light guide 119 at the third light extension lens 124 of the first second light guide 129, have a focal point on the target 150 at the fourth light extension lens 128 of the last second light guide 129, and share a focal point between the fourth light extension lens 128 of a front second light guide 129 of two adjacent second light guides 129 and the third light extension lens 124 of a rear second light guide 129 of the two adjacent second light guides 129 through the first second light guide 129, the intermediate second light guides 129, and the last second light guide 129.

When the first light guide 129 includes first and second light extension lenses 114 and 118 that are a convex lens and a concave lens, the second light guide 129 includes third and fourth light extension lenses 124 and 128 that are convex lenses, and the first to fourth light extension lenses 114, 118, 124, and 128 are horizontally positioned with respect to the traveling direction of light 5, the length L of the light capturing unit 130 may be, for example, described but not restricted to, $L=\Sigma_{k=1}^{2n} f_k$ (where k and n are natural numbers, $f_k$ is the focal distance of the k-th lens, and n≥2) between the light analysis unit 10 and the target 150. The first to fourth light extension lenses 114, 118, 124, and 128 have a numerical number $(NA_k)$=(lens diameter $(D_k)$)/(2×focal distance $(f_k)$), (where k is a natural number from 1 to 2n) at each light extension lens 114 or 118 or 124 or 128.

The focal distance $f_{2n}$ of the k=2n-th lens is $f_{2n}=f_1*m$ (where m is a scaling factor). The lens diameter $D_{2n}$ of the k=2n-th lens is $D_{2n}=D_1*m$. The numerical aperture $NA_{2N}$ of the k=2n-th lens is $NA_{2N}=NA_1$. Alternatively, the focal distance $f_{2n}$ of the k=2n-th lens may be $f_{2n}=f_1*m1$ (where m1 is a first scaling factor). The lens diameter $D_{2n}$ of the k=2n-th lens may be $D_{2n}=D_1*m2$ (where m2 is a second scaling factor). The first scaling factor m1 may have a different size from the second scaling factor m2. The numerical aperture $NA_{2N}$ of the k=2n-th lens may be $NA_{2N} \neq NA_1$.

Meanwhile, the Raman spectroscopic device 140 may include a long pass filter (not shown in the figures) between the diffraction grating 4 and the dichroic mirror 7.

Meanwhile, the Raman spectroscopic device 140, though not shown in the figures, may include the light generator 6 of FIG. 5 around the first light guide 119 and the second light guide 129 and may include the dichroic mirror 7 of FIG. 5 between the first and second light extension lenses 114 and 118 at the first light guide 119. In more detail, in the Raman spectroscopic device 140, the light analysis unit 10 may include a light sensor 1, a light collection lens 3, a diffraction grating 4, and a light passing lens 9. The light capturing unit 80 may include a light generator 6 around a first light guide 119 and a second light guide 129, may include a first light extension lens 114 and a second light extension lens 118 at the first light guide 119, may include a dichroic mirror 7 between the first light extension lens 114 and the second light extension lens 118, and may include a third light extension lens 124 and a fourth light extension lens 128 at the second light guide 129.

In the light capturing unit 130, the light generator 6 emits light 5 to the dichroic mirror 7 and the light 5 reaches a target 150 sequentially through the second light extension lens 118, the third light extension lens 124, and the fourth light extension lens 128, whereby scattered light 154 is produced at the target 150. While the scattered light 154 sequentially passes through the fourth light extension lens 128, third light extension lens 124, the second light extension lens 118, and the dichroic mirror 7, inelastic scattered light 152 may be produced at the dichroic mirror 7. The inelastic scattered light 152 can reach a light sensor 1 sequentially through the first light extension lens 114, an aperture S2 of a light analysis unit 10, a light passing lens 9, a diffraction grating 4, and a light collection lens 3.

Further, the Raman spectroscopic device 140 may include a long pass filter (not shown in the figures) between the first light extension lens 114 and the dichroic mirror 7.

Figure 10:
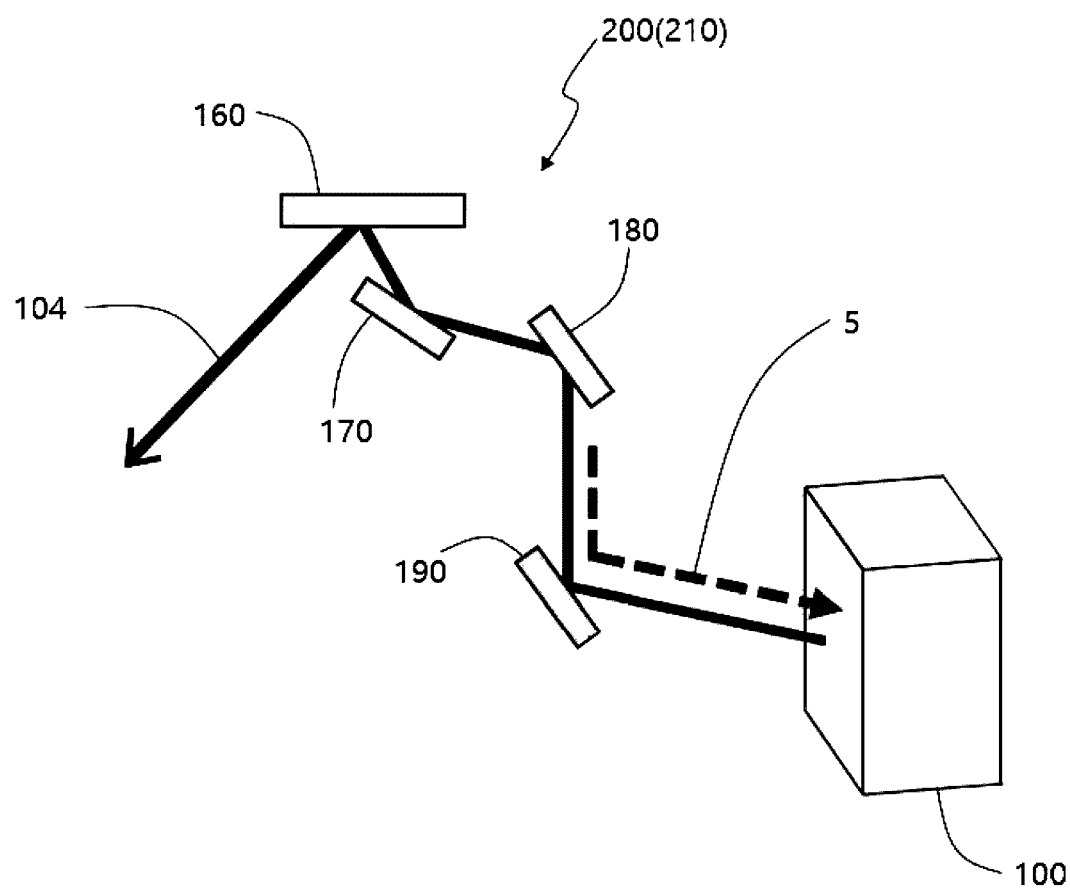
FIG. 10 is a schematic view showing a Raman spectroscopic device according to a fourth embodiment of the present disclosure.

FIG. 10 is a schematic view showing a Raman spectroscopic device according to a fourth embodiment of the present disclosure.

Referring to FIG. 10, the Raman spectroscopic device 210A may have a structure similar to the Raman spectroscopic device 90 of FIG. 4. Accordingly, the Raman spectroscopic device 210 is not shown and described, if possible, for the same configuration as the Raman spectroscopic device 90 of FIG. 4.

First, in the Raman spectroscopic device 210, the first light guide 69 may include a first light extension lens 64 and a second light extension lens 68 that are positioned sequentially from the light analysis unit 10. The second light guide 200 may include a first lens-mirror combination and a second lens-mirror combination that are positioned sequentially from the first light guide 69. The first and second lens-mirror combinations may be formed, in each lens-mirror combination, by arranging at least one (not shown in the figures) of a flat lens, a convex lens, a concave lens, and a aspheric lens and at least one of a flat mirror 160, a concave mirror 170, and convex mirrors 180 and 190.

The first and second light extension lenses 64 and 68 and the first and second lens-mirror combinations may be spaced apart from the path of the light 5 from the light generator 6 or may be positioned in the path of the light 5 from the light generator 6.

Alternatively, the first light guide may include a first lens-mirror combination and a second lens-mirror combination (not shown in the figures) that are positioned sequentially from the light analysis unit 10. The second light guide 200 may include a third lens-mirror combination and a fourth lens-mirror combination that are positioned sequentially from the first light guide. The first and fourth lens-mirror combinations may be formed, in each lens-mirror combination, by arranging at least one (not shown in the figures) of a flat lens, a convex lens, a concave lens, and a aspheric lens and at least one of a flat mirror 160, a concave mirror 170, and convex mirrors 180 and 190.

The first to fourth lens-mirror combinations may be spaced apart from the path of the light 5 from the light generator 6 or may be positioned in the path of the light 5 from the light generator 6.

The invention claimed is:

1. A Raman spectroscopic device that includes a light capturing unit and a light analysis unit disposed away from a target, includes a light sensor, a light collection lens, a diffraction grating, and a light passing lens at the light analysis unit, produces scattered light at the target by generating and then emitting light to the target by means of one of the light analysis unit and the light capturing unit, captures the scattered light from the target and transmits the scattered light to the light analysis unit by means of the light capturing unit, decomposes the scattered light in accordance with wavelengths at the diffraction grating while sequentially passing the scattered light through the light passing lens and the diffraction grating by means of the light analysis unit, and collects and transmits the decomposed scattered light to the light sensor by means of the light collection lens, wherein the light capturing unit includes one first light guide and at least one second light guide that are sequentially arranged toward the target from the light analysis unit, and transmits the light to the target through at least one of the first light guide and the second light guide or receives the scattered light from the target through the first light guide and the second light guide and transmits the scattered light to the light passing lens.

2. The Raman spectroscopic device of claim 1, wherein the first light guide includes a first light extension lens and a second light extension lens that are convex lenses and sequentially positioned away from the light passing lens, and makes the scattered light parallel between the first light extension lens and the second light extension lens;

the first light extension lens has a focal point at an aperture of the light analysis unit and has the same numerical aperture (NA) as the light passing lens; and the second light extension lens has a numerical aperture that is the same as or different from that of the light passing lens.

3. The Raman spectroscopic device of claim 2, wherein when the light passing lens is a convex lens, the first and second light extension lenses share a focal point with the light passing lens at the aperture of the light analysis unit at the first light extension lens, and have a focal point in front of the second light guide positioned closest to the second light extension lens at the second light extension lens.

4. The Raman spectroscopic device of claim 1, wherein when the first light guide includes first and second light extension lenses, which are convex lenses and sequentially positioned from the light passing lens, and there is one second light guide, the second light guide includes third and fourth light extension lenses that are convex lenses and positioned sequentially from the second light extension lens, has a larger numerical aperture than the first and second light extension lenses at the third and fourth light extension lenses, has a numerical aperture, which is the same as or different from that of the fourth light extension lens, at the third light extension lens, and makes the scattered light parallel between the third and fourth light extension lenses.

5. The Raman spectroscopic device of claim 4, wherein when the light passing lens is a convex lens, the third and fourth light extension lenses share a focal point with the second light extension lens at the third light extension lens, and have a focal point on the target at the fourth light extension lens.

6. The Raman spectroscopic device of claim 1, wherein when the first light guide includes first and second light extension lenses, which are convex lenses and sequentially positioned from the light passing lens, and there is a plurality of second light guides, the plurality of second light guides, in each second light guide, includes third and fourth light extension lenses that are convex lenses and positioned sequentially toward the target from the first light guide, makes the scattered light parallel between the third and fourth light extension lenses, and has a numerical aperture that gradually increases toward the target from the first light guide.

7. The Raman spectroscopic device of claim 6, wherein when the light passing lens is a convex lens, a first second light guide positioned close to the first light guide, a last second light guide positioned close to the target, and intermediate second light guides positioned between the first second light guide and the last second light guide share a focal point with the second light extension lens of the first light guide at the third light extension lens of the first second light guide, have a focal point on the target at the fourth light extension lens of the last second light guide, and share a focal point between the fourth light extension lens of a front second light guide of two adjacent second light guides and the third light extension lens of a rear second light guide of the two adjacent second light guides through the first second light guide, the intermediate second light guides, and the last second light guide.

8. The Raman spectroscopic device of claim 1, wherein the first light guide includes a first light extension lens being a convex lens and a second light extension lens being a concave lens that are sequentially positioned away from the light passing lens, and makes the scattered light parallel between the first light extension lens and the second light extension lens;

the first light extension lens has a focal point at an aperture of the light analysis unit and has the same numerical aperture as the light passing lens; and the second light extension lens has a numerical aperture that is the same as or different from that of the light passing lens.

9. The Raman spectroscopic device of claim 8, wherein when the light passing lens is a convex lens, the first and second light extension lenses share a focal point with the light passing lens at the aperture of the light analysis unit at the first light extension lens, and receive collected and inclined parallel light of the second light guide positioned closest to the second light extension lens at the second light extension lens.

10. The Raman spectroscopic device of claim 1, wherein when the first light guide includes a first light extension lens being a convex lens and a second light extension lens being a concave lens, which are sequentially positioned from the light passing lens, and there is one second light guide, the second light guide includes third and fourth light extension lenses that are convex lenses and positioned sequentially from the second light extension lens, has a larger numerical aperture than the first and second light extension lenses at the third and fourth light extension lenses, has a numerical aperture, which is the same as or different from that of the fourth light extension lens, at the third light extension lens, and makes the scattered light parallel between the third and fourth light extension lenses.

11. The Raman spectroscopic device of claim 10, wherein when the light passing lens is a convex lens, the third and fourth light extension lenses transmit the scattered light at an angle to the second light extension lens at the third light extension lens, and have a focal point on the target at the fourth light extension lens.

12. The Raman spectroscopic device of claim 1, wherein when the first light guide includes a first light extension lens being a convex lens and a second light extension lens being a concave lens, which are sequentially positioned from the light passing lens, and there is a plurality of second light guide,
the plurality of second light guides, in each second light guide,
includes third and fourth light extension lenses that are convex lenses and positioned sequentially toward the target from the first light guide,
makes the scattered light parallel between the third and fourth light extension lenses, and
has a numerical aperture that gradually increases toward the target from the first light guide.

13. The Raman spectroscopic device of claim 12, wherein when the light passing lens is a convex lens,
a first second light guide positioned close to the first light guide, a last second light guide positioned close to the target, and intermediate second light guides positioned between the first second light guide and the last second light guide
transmit the scattered light at an angle to the first light guide at the third light extension lens of the first second light guide,
have a focal point on the target at the fourth light extension lens of the last second light guide, and
share a focal point between the fourth light extension lens of a front second light guide of two adjacent second light guides and the third light extension lens of a rear second light guide of the two adjacent second light guides through the first second light guide, the intermediate second light guides, and the last second light guide.

14. The Raman spectroscopic device of claim 1, wherein when the first light guide includes first and second light extension lenses that are convex lenses, or a convex lens and a concave lens, the second light guide includes third and fourth light extension lenses that are convex lenses, and the first to fourth light extension lenses are horizontally positioned with respect to a traveling direction of the light,
a length L of the light capturing unit is $L=2\Sigma_{k=1}^{2n} f_k$ (where k and n are natural numbers, $f_k$ is the focal distance of the k-th lens, and n≥2) between the light analysis unit 10 and the target, and
the first to fourth light extension lenses have a numerical number $(NA_k)$=(lens diameter $(D_k)$/(2×focal distance $(f_k)$), (where k is a natural number from 1 to 2n) at each light extension lens.

15. The Raman spectroscopic device of claim 14, wherein a focal distance $f_{2n}$ of a k=2n-th lens is $f_{2n}=f_1*m$ (where m is a scaling factor),
a lens diameter $D_{2n}$ of the k=2n-th lens is $D_{2n}=D_1*m$, and a numerical aperture $NA_{2N}$ of the k=2n-th lens is $NA_{2N}=NA_1$.

16. The Raman spectroscopic device of claim 14, wherein a focal distance $f_{2n}$ of a k=2n-th lens is $f_{2n}=f_1*m1$ (where m1 is a first scaling factor),
a lens diameter $D_{2n}$ of the k=2n-th lens is $D_{2n}=D_1*m2$ (where m2 is a second scaling factor),
the first scaling factor m1 has a different size from the second scaling factor m2, and
a numerical aperture $NA_{2N}$ of the k=2n-th lens is $NA_{2N} \neq NA_1$.

17. The Raman spectroscopic device of claim 1, wherein the first light guide includes a first light extension lens and a second light extension lens that are positioned sequentially from the light analysis unit,
the second light guide includes a first lens-mirror combination and a second lens-mirror combination that are positioned sequentially from the first light guide, and
the first and second lens-mirror combinations are formed, in each lens-mirror combination, by arranging at least one of a flat lens, a convex lens, a concave lens, and an aspheric lens and at least one of a flat mirror, a concave mirror, and a convex mirror.

18. The Raman spectroscopic device of claim 17, wherein the first and second light extension lenses and the first and second lens-mirror combinations are spaced apart from a path of the light or are positioned in the path of the light.

19. The Raman spectroscopic device of claim 1, wherein the first light guide includes a first lens-mirror combination and a second lens-mirror combination that are positioned sequentially from the light analysis unit,
the second light guide includes a third lens-mirror combination and a fourth lens-mirror combination that are positioned sequentially from the first light guide, and
the first and fourth lens-mirror combinations are formed, in each lens-mirror combination, by arranging at least one of a flat lens, a convex lens, a concave lens, and an aspheric lens and at least one of a flat mirror, a concave mirror, and a convex mirror.

20. The Raman spectroscopic device of claim 19, wherein the first to fourth lens-mirror combinations are spaced apart from a path of the light or are positioned in the path of the light.

21. The Raman spectroscopic device of claim 1, wherein when the light analysis unit includes a dichroic mirror between the diffraction grating and the light passing lens and includes a light generator configured to emit the light to the dichroic mirror and the light capturing unit includes first and second light extension lenses, which are convex lenses, or a convex lens and a concave lens, at the first light guide and includes third and fourth light extension lenses that are convex lenses at the second light guide,
the light starts from the dichroic mirror and reaches the targets sequentially through the light passing lens and the first to fourth light extension lenses.

22. The Raman spectroscopic device of claim 1, wherein when the light capturing unit includes first and second light extension lenses, which are convex lenses, or a convex lens and a concave lens, at the first light guide, includes a dichroic mirror between the first and second light extension lenses at the first light guide, includes third and fourth light extension lenses that are convex lenses at the second light guide, and includes a light generator configured to emit light to the dichroic mirror around the first light guide and the second light guide,
the light starts from the dichroic mirror and reaches the targets through the second light extension lens, the third light extension lens, and the fourth light extension lens.

* * * * *